(12) United States Patent
Stewart et al.

(10) Patent No.: US 7,617,079 B2
(45) Date of Patent: Nov. 10, 2009

(54) UNIFIED SUBDIVISION FOR ARBITRARY AND PARTIAL DEGREE SURFACES AND CURVES WITH CONSISTENT PROPERTY PROPAGATION

(75) Inventors: Ian F. Stewart, Montreal (CA); André R. Foisy, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 357 days.

(21) Appl. No.: 10/347,922

(22) Filed: Jan. 20, 2003

(65) Prior Publication Data

US 2004/0143426 A1   Jul. 22, 2004

(51) Int. Cl.
   *G06F 17/10*   (2006.01)
(52) U.S. Cl. .......................... 703/2; 345/423
(58) Field of Classification Search ............. 703/2; 345/423
   See application file for complete search history.

(56) References Cited

U.S. PATENT DOCUMENTS

| | | | |
|---|---|---|---|
| 5,636,338 A | 6/1997 | Moreton | |
| 5,929,860 A | 7/1999 | Hoppe | |
| 5,963,209 A | 10/1999 | Hoppe | |
| 5,966,133 A | 10/1999 | Hoppe | |
| 6,037,949 A | 3/2000 | DeRose et al. | |
| 6,046,744 A | 4/2000 | Hoppe | |
| 6,078,331 A | 6/2000 | Pulli et al. | |
| 6,130,673 A | 10/2000 | Pulli et al. | |
| 6,204,860 B1 | 3/2001 | Singh | |
| 6,222,553 B1 | 4/2001 | DeRose et al. | |
| 6,256,038 B1 | 7/2001 | Krishnamurthy | |
| 6,300,960 B1 | 10/2001 | DeRose et al. | |
| 6,356,263 B2 | 3/2002 | Migdal et al. | |
| 2001/0002131 A1* | 5/2001 | DeRose et al. | 345/423 |
| 2003/0218609 A1* | 11/2003 | Maillot et al. | 345/423 |

OTHER PUBLICATIONS

Maillot Jerome., et al., "A Unified Subdivision Scheme for Polygonal Modeling", Computer Graphics Forum, The Eurographics Association and Blackwell Publishers, vol. 20, No. 3, Sep. 2001, pp. C/471-479, 556.

Stam, Jos., On subdivision schemes generalizing uniform B-spline surfaces of arbitrary degree, Computer Aided Geometric Design, vol. 18, No. 5, May 31, 2001, pp. 383-396.

Zorin, Denis, et al., "A unified framework for primal/dual quadrilaterial subdivision schemes", Computer-Aided Geometric Design, vol. 18, No. 5, May 31, 2001, pp. 429-454.

(Continued)

*Primary Examiner*—Paul L Rodriguez
*Assistant Examiner*—Russ Guill
(74) *Attorney, Agent, or Firm*—Patterson & Sheridan, LLP

(57) ABSTRACT

To create an arbitrary-degree limit surface from a mesh, the mesh is first linearly subdivided. Additional linear subdivision and smoothing operations are performed on the initially linearly subdivided mesh. The number of sets of linear subdivision and smoothing operations depends on the desired surface-degree and subdivision level. This procedure can be used to create arbitrary-degree limit surfaces without performing a dual operation. During subdivision the topology of the intermediate mesh is independent of the goal limit surface-degree.

24 Claims, 5 Drawing Sheets

OTHER PUBLICATIONS

Biermann, Henning, et al., "Piecewise Smooth Subdivision Surfaces with Normal Contro", Computer Graphics (SIGGRAPH Proceedings), 2000, pp. 113-120.

Bischoff, Stephen, et al., "Towards Hardware Implementation of Loop Subdivision", In Proceedings 2000 SIGGRAPH /Eurographics workshop on Graphics hardware, pp. 41-50, ACM Press, 2000.

Boltz, Jeffrey, et al., "Rapid Evaluation of Catmull-Clark Subdivision Surfaces", In Proceedings of the Web3D 2002 Symposium (WEB3D-02), pp. 11-18, New York, Feb. 24-28, 2002, ACM Press.

Hertzmann, Aaron et al., "Illustrating Smooth Surfaces", In Proceedings of SIGGRAPH 2000, (New Orleans, LA, Jul. 23-28, 2000), Computer Graphics Proceedings, Annual Conference Series, pp. 51726. ACM SIGGRAPH, 2000.

Junkins, Stephen, et al., "Subdividing Reality: Employing Subdivision Surfaces for Real-Time Scalable 3D", 2000 Game Developers Conference.

Kobbelt, Leif, "Discrete Fairing", In Proceedings of the Seventh IMA Conference on the Mathematics of Surfaces '97, pp. 101-131, 1997.

Litke, Nathan et al. "Trimming for subdivision surfaces", Computer Aided Geometric Design 18, 2001, pp. 463-481.

Maillot, Jerome, et al., "A Unified Subdivision Scheme for Polygonal Modeling", Eurographics 2001, vol. 20, No. 3, 2001.

Muller, Kerstin et al., "Subdivision Surface Tesselation on the Fly using a versatile Mesh Data Structure", Eurographics 2000, vol. 19 (2000), No. 3.

Peters, Jorg, et al., "The Simplest Subdivision Scheme for Smoothing Polyhedra", ACM Transactions on Graphics, vol. 16, No. 4, Oct. 1997, pp. 420-431.

Pulli, Kari, et al., "Fast Rendering of Subdivision Surfaces", In Rendering Techniques '96, Proceedings of the 7th Eurographics Workshop on Rendering, pp. 61-70, 1996.

Pulli, Kari et al., "Hierarchical editing and rendering of subdivision surfaces" Technical Report, University of Washington, 1997.

Sederberg, Thomas W., et al., "Non-Uniform Recursive Subdivision Surfaces", in Computer Graphics Proceedings, ACM SIGGRAPH, Jul. 1998, Annual Conference Series, pp. 387-394.

Schmitt, Francis J., et al., "An Adaptive Subdivision Method for Surface-Fitting from Sampled Data", SIGGRAPH 86, Dallas, TX, Aug. 18-22, 1986, ACM 0-89791-196-2/86/008/0179, vol. 20, No. 4, 1986, pp. 179-188.

Schweitzer, Jean E., "Analysis and Application of Subdivision Surfaces", Technical Report UW-CSE-96-08-02, a PhD Dissertation, Aug. 1996.

Southern, Richard, et al., "A Stateless Client for Progressive View-Dependent Transmission", Web 3D 2001, Feb. 2001.

Stam, Jos, J. Stam, "Exact evaluation of Catmull-Clark subdivision surfaces at arbitrary parameter values," in Computer Graphics Proceedings, ACM SIGGRAPH, Jul. 1998, Annual Conference Series, pp. 395-404.

Stam, J.. "On subdivision schemes generalizing uniform B-spline surfaces of arbitrary degree", Computer Aided Geometric Design, vol. 18, No. 5, Jun. 2001, pp. 383-396.

Stam, J., et al., "Quad/Triangle Subdivision", May 2002, Preprint.

Von Overveld, C.W.A.Am., et al., "An Algorithm for Polygon Subdivision Based on Vertex Normals", Proceedings of the 1997 Conference on Computer Graphics International, 1997, pp. 3-12.

Zorin, D. et al., "A Unified Framework for Primal/Dual Quadrilateral Subdivision Schemes", Computer Aided Geometric Design, Special issue on Subdivision Surfaces., 18, 2001.

Zorin, Denis, "Ck Continuity of Subdivision Surfaces", 1996.cs-tr-96-23, pp. 64, 1996.

* cited by examiner

UNIFIED SUBDIVISION FOR ARBITRARY AND PARTIAL DEGREE SURFACES AND CURVES WITH CONSISTENT PROPERTY PROPAGATION

BACKGROUND

In many computer graphics applications, such as three-dimensional modeling and animation, a known problem is the building of smooth surfaces from meshes of arbitrary topology. Typically such surfaces are defined by starting with an arbitrary mesh that defines faces, vertices and edges, and their connectivity. The mesh is repeatedly subdivided to create intermediate meshes in a procedure that converges to a smooth limit surface. In practice, the intermediate meshes created are used as an approximation of the limit surface.

For meshes in which the faces are quadrilaterals, known subdivision schemes are either primal, which involves splitting faces, or dual, which involves splitting vertices, by replacing vertices with faces and faces with vertices. In general, schemes for generating an odd-degree limit surface are primal schemes using linear subdivision and a smoothing pass to compute the result. An example primal scheme, which generates a surface of degree three, is described in "Recursively Generated B-Spline Surfaces on Arbitrary Topological Meshes," by E. Catmull and J. Clark, in *Computer-Aided Design*, Volume 10, Number 6 (November 1978), pages 350-355. In general, schemes for generating an even-degree limit surface are dual schemes using linear subdivision and an operation that replaces a mesh with its dual topology. An example dual scheme, which generates a surface of degree two is described in "Behaviour of recursive division surfaces near extraordinary points," by D. Doo and M. Sabin, in *Computer-Aided Design*, Volume 10, Number 6 (November 1978), pages 356-360.

Several attempts have been made to unify the procedures used for creating even degree and odd degree limit surfaces. For example, Jos Stam, "On Subdivision Schemes Generalizing Uniform B-spline Surfaces of Arbitrary Degree," *Computer Aided Geometric Design—Special Edition on Subdivision Surfaces*, Volume 18, pages 383-396, 2001, ("the Unified Reference") describes a generalized method for arbitrary degree limit surfaces that uses the dual operation. However, the Unified Reference explains how to modify the generalized procedure so that for odd-degree limit surfaces, the dual operation is not required, but notes that the dual operation is still required for generating even-degree limit surfaces.

A particular problem with subdivision of a mesh in three-dimensional modeling and animation is that the mesh may have one or more properties associated with a face, edge or vertex. Example properties include but are not limited to polygon colors and texture coordinates. These properties are propagated to the subdivided topology. This propagation of properties is particularly difficult if a subdivision scheme uses the dual operation, because there is no direct correspondence between components of the original mesh and the same type of component in the dual. For example, a single face in the dual represents portions of several faces of the original mesh. If the property associated with the original faces varies from face to face, there is no single choice of value for the property for the face in the dual that correctly represents that property in the dual. A particular problem arises with texture coordinates that are used to position a texture on the surface. These coordinates are typically associated with vertices, but may vary depending on the adjacent polygon. Vertices do not have corresponding vertices in the dual, however. Therefore, if the texture coordinates vary at a vertex, then the discontinuity in the texture at the vertex cannot be properly represented in the dual.

Another problem with subdivision of a mesh is how to handle geometric boundaries and creases. A geometric boundary is an edge that has only a single adjacent face. Creases are defined on edges of the original topology and are used to add ridges to the final limit surface, as described in "Subdivision Surfaces in Character Animation," by T. D. DeRose, M. Kass and T. Truong, in *Proceedings of SIGGRAPH* 98, (July 1998), pages 85-94 (the "Crease Reference"). For odd degree subdivision schemes, rules are specified for vertices lying on a boundary or crease such that the edges that form the boundary or crease converge to a curve with the same odd-degree as the limit surface. However, as noted in the Unified Reference, it is not at all clear how to add boundary and crease rules to a subdivision scheme that uses a dual operation, because the edge defining the crease or boundary does not exist in the dual topology. Also, for all meshes with geometric boundaries, the dual of the mesh has strictly fewer faces than the original mesh. As a result, if repeated dual operations are performed on a mesh, the mesh has fewer faces. If the dual operation is repeated enough times, the mesh will eventually have no boundaries or no polygons. Yet, the arbitrary degree scheme in the Unified Reference uses a dual operation repeatedly. Also, prior even-degree subdivision schemes use the dual at least once, and hence have this problem to some extent. If such boundaries and creases are needed, the Unified Reference recommends primal subdivision schemes, because they do not use the dual operation, which implies that only odd-degree surfaces can be generated when boundaries and creases are required. Current subdivision schemes also generate a limit surface with a constant degree. There is no mechanism for creating surfaces that interpolate between two limit surfaces of different degrees, or allow the target surface degree to vary over the limit surface.

The Unified Reference also notes that procedures using the dual operation are inefficient because the topology changes drastically. To remedy this inefficiency, a specialized data structure is described in "A Unified Framework for Primal/Dual Quadrilateral Subdivision Schemes", by D. Zorin and P. Shröder, in *Computer Aided Geometric Design*, Volume 18, Number 5, (June 2001), pages 429-454. This data structure encodes both the mesh and its dual. Although slower because of the dual operation, the approach of the Unified Reference has the advantage that such specialized data structures are not required.

The above problems listed for surfaces also exist for the generation of curves based on polylines. A polyline is a set of vertices chained together by line segments. There are known polyline subdivision procedures that, if applied repeatedly, converge to curves of arbitrary degree. These procedures, however, suffer from the analogous problems existing with subdivision of surfaces. In particular, properties cannot be properly propagated, and there is no mechanism for interpolating between limit curves of different degrees or varying the target degree along the curve.

SUMMARY

If a linear subdivision is performed on a mesh of planar polygons, the resulting topology, though different, is merely more tessellated. Therefore, the shape of the surface does not change. Accordingly, a mesh resulting from an even-degree procedure can be modified by using a linear subdivision operation to result in a new mesh with the same surface shape but more tessellated.

A smoothing operation has been discovered that has the property that performing the dual of a mesh followed by a linear subdivision is equivalent to performing a linear subdivision followed by this smoothing operation. The smoothing operation is a local operation, meaning that for the computation of a given vertex, it uses information from the vertices of only those faces adjacent to the vertex in the mesh.

By using this relationship (namely, that a dual operation followed by a linear subdivision operation is equivalent to a linear subdivision operation followed by this smoothing operation), a subdivision procedure has been defined for creating arbitrary-degree limit surfaces. This subdivision procedure does not use any dual operations, but rather can be performed using solely linear subdivision and local smoothing operations, even for even-degree limit surfaces. This subdivision procedure provides the same surface shape as typical dual or primal subdivision procedures but has a more tessellated topology.

To create an arbitrary-degree limit surface from a mesh, the mesh is first linearly subdivided. Additional linear subdivision and smoothing operations are performed on the initially linearly subdivided mesh. The number of sets of linear subdivision and smoothing operations depends on the desired surface-degree and subdivision level. This procedure can be used to create arbitrary-degree limit surfaces without performing a dual operation. During subdivision the topology of the intermediate mesh is independent of the goal limit surface-degree.

As a result, several capabilities are provided. First, subdivision of a mesh to an arbitrary degree can be computed and rendered quickly and efficiently using the same procedure and data structures for both even and odd degree limit surfaces. The procedure has the speed of the procedure in Zorin and Schröder, but like the Unified Reference, does not require a specialized data structure. Data structures known for accelerating or reducing memory consumption of primal subdivision methods may be used to accelerate this procedure. Boundary and crease rules currently used for odd degree subdivision also may be extended to be used for an even degree subdivision in this procedure.

Second, surface properties can be propagated from an original mesh to the intermediate meshes, and the limit surface, no matter the goal surface degree.

Finally, it is possible to interpolate between limit surfaces of different degrees, and in fact, vary the surface degree and amount of interpolation across the surface. This technique allows specifying, on the original mesh components, the desired surface smoothness of different portions of the limit surface, including the boundaries. A smooth surface is automatically generated between regions of different degree.

It has also been discovered that similar techniques can be applied to subdivision procedures for generating of curves from polylines. Subdivision procedures exist that take a polyline, and return a new polyline that is smoothed. As the subdivision procedure repeatedly modifies the polyline, the polyline converges to a limit curve of arbitrary degree. As with subdivision of surfaces, prior methods for generating curves with an even degree perform the polyline equivalent of the dual operation. It has been discovered that the polyline dual operation followed by a linear subdivision can be computed by doing a linear subdivision followed by a certain smoothing operation.

By using this fact, a curve subdivision procedure for generating arbitrary-degree curves is defined that does not use any dual operations. The procedure begins by linearly subdividing the polyline, to create an intermediate polyline. The intermediate polyline is repeatedly linearly subdivided and smoothed, to the desired subdivision level. The amount of subdivision and smoothing is dependent on the desired subdivision level and desired limit-curve degree.

As with the procedure for subdividing a mesh, this procedure for subdividing a polyline enables several capabilities that are analogous to capabilities enabled for subdivision surfaces. First, curves of odd and even degree can be generated using the same data structures and procedures, and any acceleration or memory consumption optimizations existing for existing odd-degree schemes may be applied to this procedure. Second, properties associated with the vertices and segments can be properly propagated to the limit curve and the intermediate approximating polylines. Finally, it is possible to interpolate between limit curves of different degrees, and in fact, smoothly vary the curve degree and amount of interpolation along the curve.

DETAILED DESCRIPTION

Figure 1:
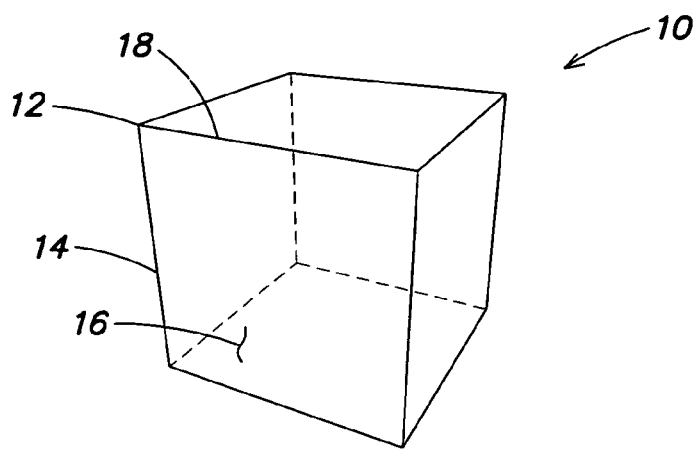
FIG. 1 is a drawing of an example input mesh.

To build a smooth surface with arbitrary topology, an initial mesh is defined by specifying faces, vertices and edges. The vertices and edges define n-sided faces. Typically, an input mesh has faces that are mostly, but not necessarily all, quadrilaterals. This mesh is repeatedly subdivided in a limiting procedure that converges to a smooth surface. Intermediate meshes are used as an approximation of this limit smooth surface. An example mesh, for the purpose of illustration only, is shown in FIG. 1. FIG. 1 illustrates a cube 10, defined by eight vertices, e.g., 12, and twelve edges, e.g., 14, defining six faces, e.g., 16.

A mesh generally is defined by three arrays that store the vertices, edges and faces. The data structure representing each vertex may include, for example, data defining its position as well as the indices of the neighboring edges and faces. Each vertex has a valence that is equal to the number of polygons adjacent to the vertex. A vertex in a quadrilateral mesh is called regular if it has valence four; otherwise it is called irregular. The data structure representing each edge may include, for example, data defining the indices of its endpoints and the indices of the two adjacent faces. The data structure representing each face may include, for example, data defining the indices of its neighboring faces, edges and vertices.

Properties, such as face material definitions (color, specularity, roughness), and/or textures may be associated with the mesh. Texture-coordinates generally are associated with vertex-face pairs, where the face is one of the faces adjacent to the vertex. Other properties may be associated with, for example, but not limited to, vertices, edges and/or faces, edge-vertex pairs, edge-face pairs.

Subdivision is performed to a level, called the Subdivision Level, that represents the number of times the mesh is linearly subdivided. A linear subdivision operation on a mesh does not affect the vertices of the original mesh. New vertices are added at the midpoint of each edge and at the centroid of each face. Edges are added connecting face centroids with each of the surrounding edge midpoints. Thus, an N-sided face leads to N quadrilaterals in the new mesh. If the mesh defines planar faces, the shape of the surface remains the same and the topology is simply more tessellated. If the mesh defines a non-planar face, the surface is not well defined; however, the centroid still may be used as a valid estimation of a point on that face.

Figure 2:
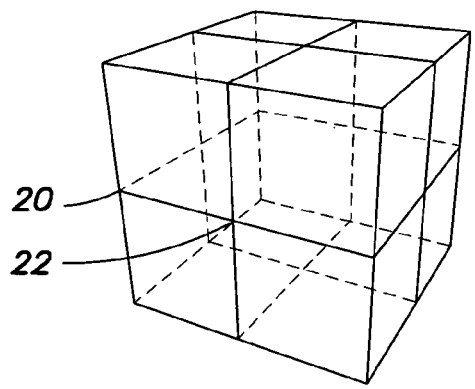
FIG. 2 is a drawing of the mesh of FIG. 1 after linear subdivision.

FIG. 2 illustrates the cube 10 of FIG. 1 after a first linear subdivision operation. New vertices, e.g., 20 are added at the midpoints of each edge, e.g., 14, and at the centroid 22 of each face, e.g., 16. Similarly, in FIG. 3, which illustrates the cube of FIG. 2 after a second linear subdivision operation, new vertices, e.g., 30 and 32, are added and the midpoints of each edge, and at the centroid, e.g., 34, of each face.

After the mesh is linearly subdivided for each level, an additional subdivision operation, typically a smoothing operation or a dual operation, is performed repeatedly on the mesh. The number of times this operation is performed varies depending on the desired limit surface degree, called the Surface Degree, which may be either even or odd. The Surface Degree determines whether the subdivided surface, as the Subdivision Level approaches infinity, converges to an even-degree limit surface or an odd-degree limit surface.

In the Unified Reference, a generalized procedure called "Simple" for generating an arbitrary degree limit surface is defined as follows:

```
Simple (M, L, d)
    for SL = 1 to L
        M = LinSubdivide ( M )
        for D=1 to d−1 do
            M = Dual (M)
        end for
    end for
    return ( M )
``` where M is a mesh, where d is the Surface Degree, and L is the desired Subdivision Level. As L approaches infinity, the resulting surface approaches a limit-surface of degree d.

If a linear subdivision is performed on a mesh, the resulting topology, though different, is merely more tessellated. Therefore, the shape of the surface does not change. For example, this Simple procedure can be modified in the following manner such that a new mesh with the same surface shape, but extra topology, is obtained:

```
Simple_Modified (M, L, d)
    for SL = 1 to L
        M = LinSubdivide ( M )
        for D=1 to d−1 do
            M = Dual (M)
        end for
    end for
```

-continued

```
    M = LinSubdivide ( M )
    return ( M )
```

The procedure can now be reorganized as follows, giving the following procedure, which performs the same steps as Simple_Modified:

```
Simple_Modified_Rearranged (M, L, d)
    M = LinSubdivide ( M )
    for SL = 1 to L
        for D=1 to d−1 do
            M = Dual (M)
        end for
        M = LinSubdivide ( M )
    end for
    return ( M )
```

Note that the last Dual operation of the "for D" loop of the Simple_Modified_Rearranged procedure is always followed by a linear subdivision.

It has been discovered that, if no geometric boundaries are present, a dual operation performed on a mesh followed by a linear subdivision operation produces the same topology and same surface shape as a linear subdivision operation performed on the mesh followed by a specific smoothing operation, described in more detail below. As a result, the Simple_Modified_Rearranged procedure can be simplified by substituting pairs of dual and linear subdivision operations by a pair of linear subdivision and smoothing operations, which results in the following procedure:

```
Arbitrary_Degree_Subdivision (M, L, d)
    M = LinSubdivide( M )
    for SL = 1 to L
        M = LinSubdivide( M )
        for D = 1 to d−1 do
            SmoothMesh( M )
        end for
    end for
    return ( M )
``` where M is a mesh, where L is the Subdivision Level, and where d is the Subdivision Degree.

The SmoothMesh operation is as follows. For every vertex of the mesh M, a new position is computed according to the existing vertex positions using a SmoothVertex function (below). The positions are computed in such a way that the modification of one vertex does not affect the computation of another vertex. This computation can be performed, for example, by storing the newly computed positions in temporary storage. After all the new positions have been computed, the new positions are transferred from temporary storage and assigned to the vertices.

For a given vertex v, there are two types of vertices in the immediate neighborhood. Adjacent vertices are vertices that share an edge with vertex v, and diagonal vertices are vertices that share a quadrilateral with vertex v, but are not the vertex v or adjacent to the vertex v. The SmoothVertex operation is defined as follows:

```
Smooth Vertex(v)
    If all the adjacent vertices of v are regular, then
        return the average position of the diagonal vertices of v
    Else
        return 2*(the average of the adjacent vertices of v)-position of v
    End if
``` where v is the vertex to be smoothed.

The smoothing operation is a local operation, meaning that for the computation of a given vertex, it uses information from the vertices of only those faces adjacent to the vertex in the mesh. The smoothing operation is described here for vertex positions, but is not restricted to vertex positions. The operation can be applied to any property associated with the vertices that can be linearly interpolated, i.e., any property where two values of the property can be averaged to produce a new value.

This procedure is based on the fact that a dual operation followed by a linear subdivision operation can be substituted by a linear subdivision operation followed by a smoothing operation. This substitution is only theoretically correct for meshes without geometric boundaries. However, the procedure nonetheless behaves in an intuitively correct manner even in the presence of geometric boundaries.

An alternative substitution also can be made. In a mesh without boundaries, two simultaneous dual operations results in the same topology, but smoothed. Two simultaneous dual operations can be replaced by an EvenSmoothMesh operation, as described in the Unified Reference. This smoothing operation computes new values as with SmoothMesh, but with the following operation per vertex:

```
EvenSmoothVertex( v )
    return 0.25*(average position of the diagonal vertices of v)
         + 0.5*(average position of the adjacent vertices of v)
         + 0.25*(vertex v)
```

Starting again from Simple_Modified_Rearranged described above, pairs of Dual operations may be replaced with EvenSmoothMesh operations:

```
Simple_Modified_EvenSmooths (M, L, d)
    M = LinSubdivide ( M )
    for SL = 1 to L
        for D=1 to floor( (d-1)/2) do
            M = EvenSmoothMesh(M)
        end for
        if ( d is even ) then M = Dual( M )
        M = LinSubdivide ( M )
    end for
    return ( M )
``` where M is the original mesh, L is the desired Subdivision Level, and d is the desired Surface Degree. This substitution leaves a single Dual operation if the Surface Degree d is even. This last Dual operation can be eliminated using the method described above:

```
Arbitrary_Degree_Subdivision_EvenSmooths (M, L, d)
    M = LinSubdivide ( M )
    for SL = 1 to L
        for D=1 to floor( (d-1)/2) do
            M = EvenSmoothMesh(M)
        end for
        M = LinSubdivide ( M )
        if ( d is even ) then M = SmoothMesh ( M )
    end for
    return ( M ).
```

Figure 3:
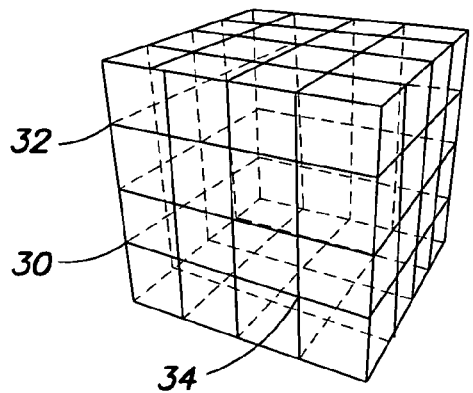
FIG. 3 is a drawing of the mesh of FIG. 2 after a second linear subdivision.
Figure 4:
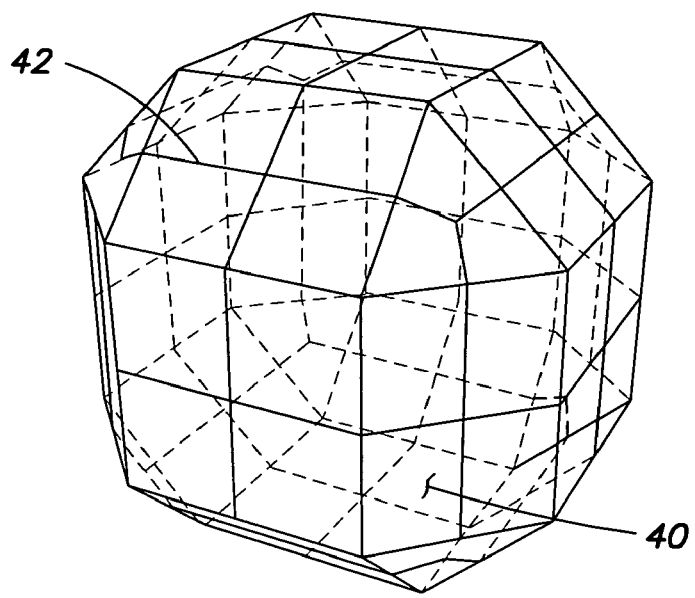
FIG. 4 is a drawing of the mesh of FIG. 3 after a first smoothing operation.
Figure 5:
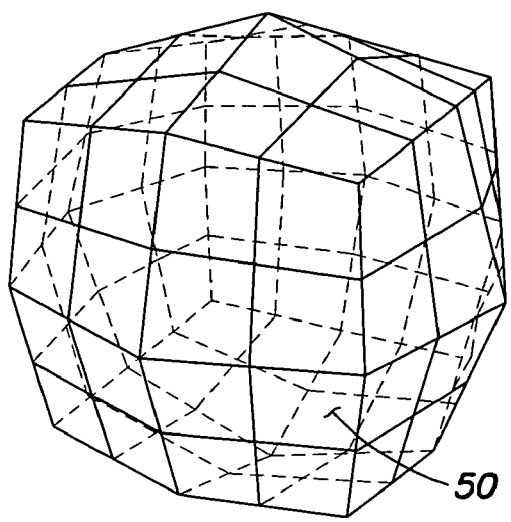
FIG. 5 is a drawing of the mesh of FIG. 3 after a second smoothing operation.

Referring to FIGS. 4 and 5, a first smoothing operation is performed on the cube of FIG. 3 to provide the mesh in FIG. 4. A second smoothing operation is performed on the mesh of FIG. 4 to provide the mesh in FIG. 5. In each of these smoothing operations, each face in the result, e.g., 50 in FIG. 5, has a corresponding face in the original mesh, e.g., 40 in FIG. 4. There also is a one-to-one correspondence between vertices and edges. Only the positions of the vertices (and thus the edges and faces) have changed.

Figure 6:
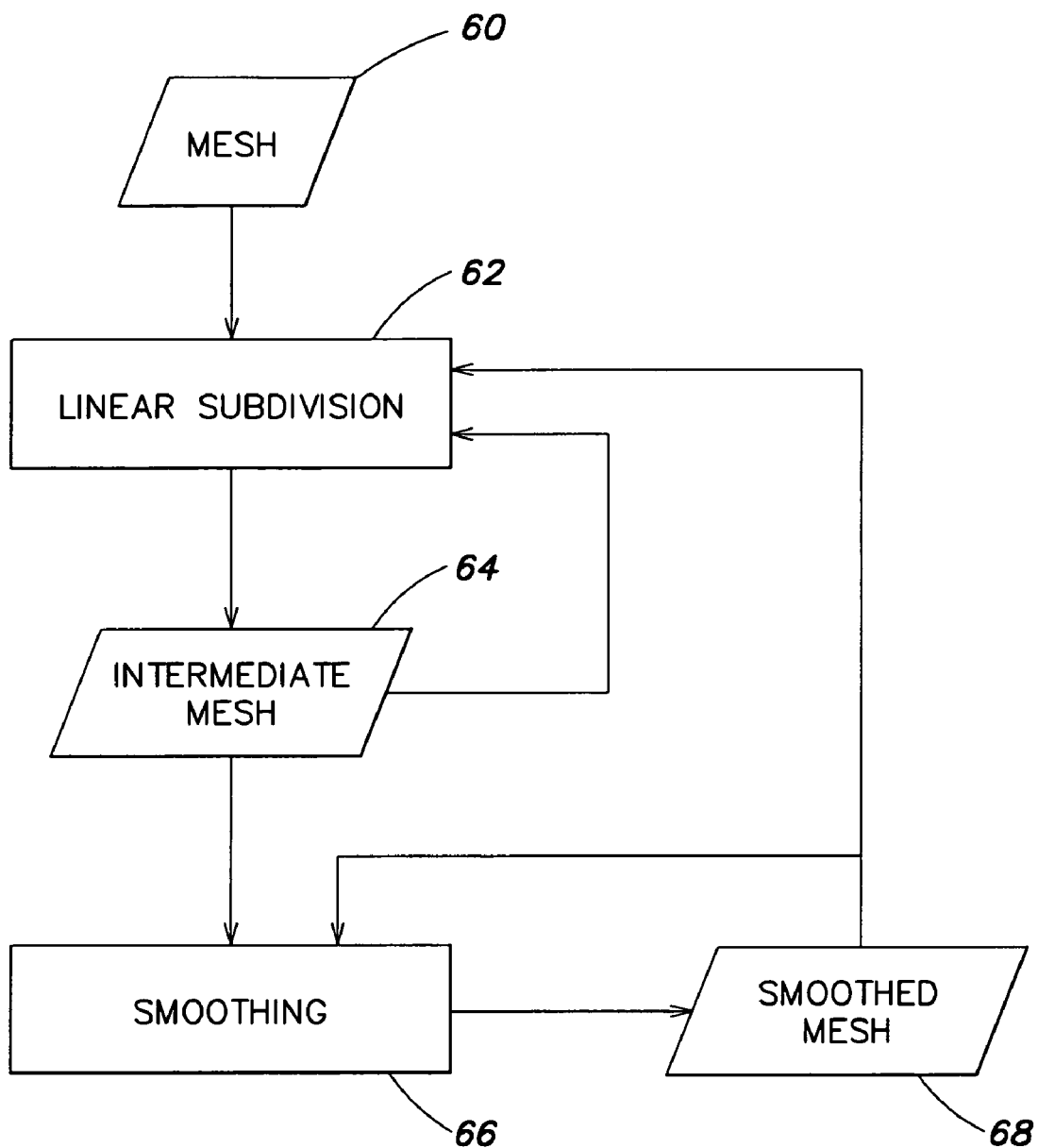
FIG. 6 is a data flow diagram of an implementation of a subdivision operation on a mesh.

A data flow diagram of this Arbitrary_Degree_Subdivision procedure will now be described in connection with FIG. 6. In particular, an input mesh 60 is linearly subdivided by a linear subdivision module 62 to produce an intermediate mesh 64. For each subdivision level SL, the intermediate mesh is then linearly subdivided by the linear subdivision module 62. This linearly subdivided mesh is then smoothed by a local smoothing module 66 to produce a smoothed mesh 68. The smoothing operation is applied to the mesh d−1 times, where d is the surface degree. For additional subdivision levels SL, the smoothed mesh 68 is applied again to the linear subdivision module 62, the output of which is applied again to the smoothing module 66 for d−1 times. The Arbitrary_Degree_Subdivision subdivision procedure does not replace the mesh with its dual topology, even for even-degree limit surfaces. If there are no geometric boundaries, the subdivision procedure provides the same surface shape as the Simple procedure as well as other typical dual or primal subdivision procedures, but has a more tessellated topology, i.e., it has an additional linear subdivision. This extra topological information allows discontinuities in properties, such as a change in color, to be represented.

Figure 7:
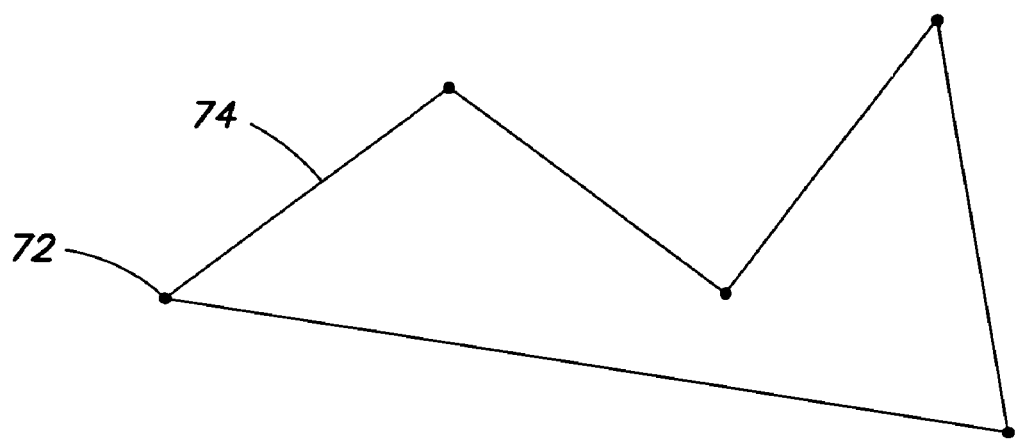
FIG. 7 is a drawing of an example input polyline with five vertices.

The same technique for creating this surface subdivision procedure can be used to generate a polyline subdivision procedure with similar properties. A polyline is defined by an ordered set of vertices joined together by line segments. The first and last vertex of the set may optionally be connected by a segment. The polyline subdivision procedure,; like the surface subdivision procedure, is an iterative process. At the limit, the procedure produces a smooth curve with an arbitrary degree. An example polyline, for the purpose of illustration only, is shown in FIG. 7. FIG. 7 illustrates a polyline with five vertices, e.g., 72, and five line segments, e.g., 74.

It is possible to generate a limit curve from a polyline by repeated applications of polyline linear subdivision and dual operations. Intermediate polylines can be used to approximate the limit-curve. The polyline linear subdivision and dual operations are similar to their mesh counterparts: linear subdivision of a polyline introduces new vertices at the midpoint of each segment, while the polyline dual operation replaces every segment with a vertex, and connects these new vertices with new segments if the corresponding original segments shared a vertex.

The goal limit-curve degree, called the Curve Degree, determines how many dual operations are performed every subdivision iteration. The number of iterations performed, as with the meshes, is called the Subdivision Level. As the Subdivision Level approaches infinity, the resulting polyline converges to a limit-curve with the Surface Degree. Adding an extra linear subdivision operation at the end of this procedure does not change the shape of this curve; it simply increases the topology. As with subdivision of a mesh, consecutive dual and linear subdivision operations on polylines where every vertex has two adjacent edges can be computed instead by performing a linear subdivision followed by a smoothing operation.

Figure 8:
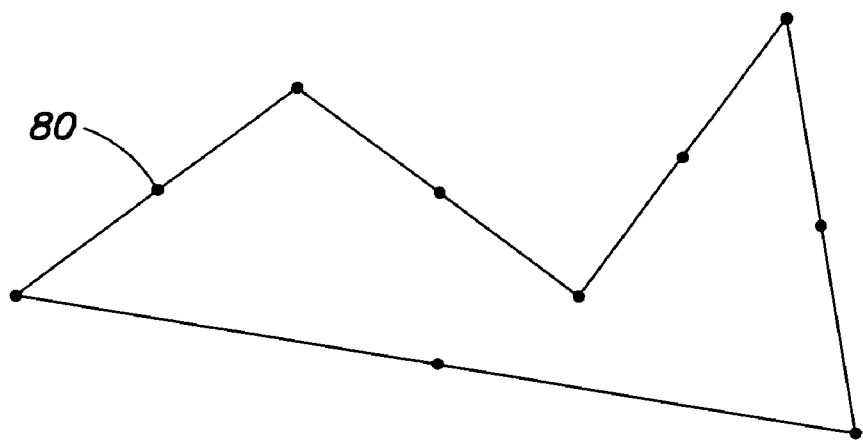
FIG. 8 is a drawing of the polyline of FIG. 7 after linear subdivision.

FIG. 8 illustrates the polyline of FIG. 7 after linear subdivision. New vertices, e.g., 80, are added at the midpoints of each line segment, e.g., 74 in FIG. 7.

The procedure for an arbitrary degree subdivision of a polyline therefore is the following:

```
Arbitrary_Degree_Subdivision_Polyline( P, L, d )
    P = LinSubdivide_Polyline ( P )
    for SL = 1 to L
        P = LinSubdivide_Polyline ( P )
        for D = 1 to d−1 do
            SmoothPolyline( P )
        end for
    end for
    return ( P )
``` where P is the initial polyline, L is the desired Subdivision Level, and d is the degree Curve Degree that the limit curve converges to as L approaches infinity.

Figure 9:
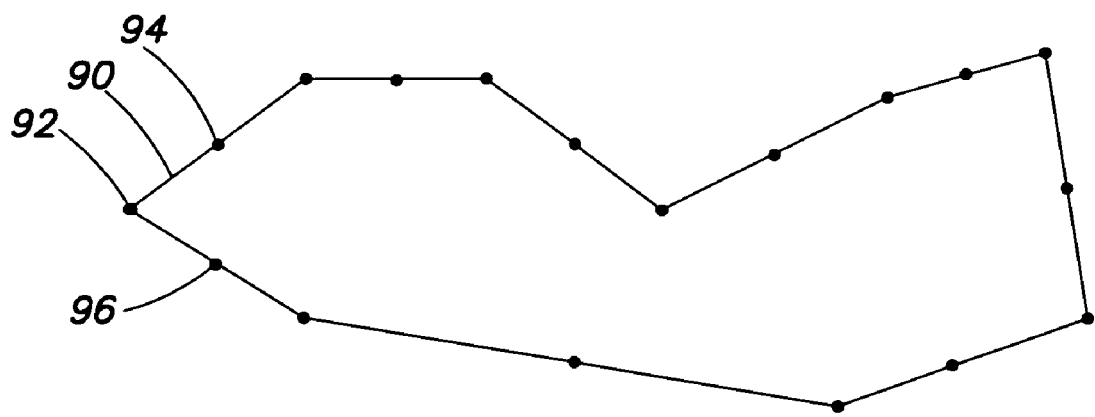
FIG. 9 is a drawing of the polyline of FIG. 8 after a second linear subdivision and the first smoothing operation.
Figure 10:
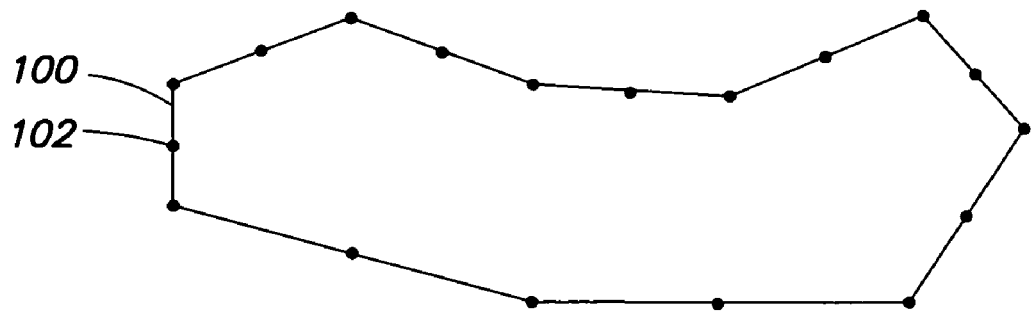
FIG. 10 is a drawing of the polyline of FIG. 9 after a second smoothing operation.

SmoothPolyline is analogous to SmoothMesh, except for each vertex the SmoothVertex_Polyline smoothing operation is performed, positioning the vertex at the average of its neighboring vertices. FIG. 9 illustrates the polyline of FIG. 8 after a second linear subdivision and a first smoothing operation. FIG. 10 illustrates the polyline of FIG. 9 after a second smoothing operation. For example, the position of vertex 92 in FIG. 9 is moved to an average of the positions of vertices 94 and 96 in FIG. 9, to result in the position of vertex 102 in FIG. 10. In each of these smoothing operations, each segment in the result, e.g., 100 in FIG. 10, has a corresponding segment, e.g., 90 in FIG. 9, in the original polyline. There is also a one to one correspondence between vertices and segments. Only the positions of the vertices (and thus the segments) have changed.

Because this procedure uses linear subdivision and smoothing operations, properties associated with the vertices and segments of the polyline can be propagated to the limit curve and the intermediate polyline approximations of this curve, without error or distortion. Example properties include, but are not limited to, polyline rendering line width and color.

As with subdivision of a mesh, this procedure for subdividing polylines depends on substituting successive dual operations and linear subdivision with the successive operations of linear subdivision and smoothing. This substitution is only theoretically correct for polylines where every vertex has precisely two adjacent edges. However, the procedure nonetheless behaves in an intuitively correct manner even in the presence this condition is not met.

As with subdivision of a mesh, an accelerated version of Arbitrary_Degree_Subdivision_Polyline can be generated using a polyline version of EvenSmooth to replace pairs of Dual operations. The polyline version of EvenSmoothMesh smooths a vertex v by taking one quarter of each vertex adjacent to v and a half of v.

The polyline version of the subdivision procedure also can be used to modify the Arbitrary_Degree_Subdivision procedure to handle the boundaries of meshes in the same manner as current odd-degree schemes. Current odd-degree schemes have special rules such that edges forming a boundary converge to a curve with the same degree as the surface. This convergence can be accomplished by applying the Arbitrary_Degree_Subdivision_Polyline procedure on the edges that form the boundary. This application of the polyline subdivision procedure involves minimal modification to the surface subdivision procedure, because the surface subdivision procedure is already performing the correct number of linear subdivision and smoothing operations on the edges forming the boundary. The SmoothVertex operation is simply modified to perform the SmoothVertex_Polyline operation if the vertex lies on a boundary. If the vertex lies on more than one boundary, there are two options. The first option is not to change the position of the vertex. The second option is to change the position of the vertex to the average of the results of computing SmoothVertex_Polyline on each boundary. Although there are multiple ways the boundary edges around a vertex can be paired together to form boundary polylines, the result is the same no matter how they are paired. The result is simply the average of all the neighboring vertices that share a boundary edge with the current vertex.

Thus, using the Arbitrary_Degree_Subdivision procedure, the subdivision of a mesh to an arbitrary degree, both even and odd, can be computed and rendered quickly and efficiently using the same procedure and data structures for both even and odd degree subdivisions. This procedure also has the same overall structure as common odd-degree procedures, because it has repeated linear subdivisions followed by smoothing passes. Therefore, existing data structures used for odd-degree procedures can be used for this procedure.

Because the procedure uses only the operations of linear subdivision and smoothing, the procedure also supports the propagation of surface properties to the intermediate meshes and the final limit-subdivision surface, irrespective of the goal degree. For example, if each face of the original mesh 10 in FIG. 1 has a color associated with it, these colors are propagated to each intermediate mesh, as shown in FIGS. 2-5. During the subdivision procedure, when a face with N vertices is linearly subdivided, it is removed and replaced with N new faces. Each of these new faces simply inherits the color of the original face. When the subdivided surface is smoothed, face colors are simply left as is, because smoothing merely changes the positions of the vertices. Therefore, on the subdivided surface, the colors of the surface will be properly propagated, something that is not possible if the dual is being used. In particular, the discontinuity in color occurring at edge 18 in FIG. 1 cannot be propagated using a dual because in the dual, which has the same shape as the topology in FIG. 4, the edge 42 is missing.

Properties associated with vertices are subdivided in the same way as the positions of the vertices. New vertices introduced along edges are given the average of the properties of the endpoints. New vertices introduced at the centroids of faces are given the average value of the properties for all the vertices of the polygon. When smoothing is performed, the SmoothVertex operation is used as described above, but applied to the property rather than the position. In fact, the position of a vertex is simply another vertex property.

Because the procedure linearly subdivides the surface one more time, extra topology is created, which permits the correspondence between geometrical components and permits properties to be transferred without distortion. If no creases are present, then some of this extra topology is not always required. Properties associated with vertices and faces can only be discontinuous at an edge of the original mesh, and hence, discontinuities can only be present on edges that are direct descendants of the original edges of the mesh, i.e., edges that are derived from subdividing an edge. This relationship can be tracked by marking edges as they are subdivided. Edges that were added in the last linear subdivision pass but are not direct ancestors of an original edge can be removed, merging the faces adjacent to the edge. If a vertex only has two or less adjacent edges after removal, the vertex can be removed as well, merging edges if necessary.

It is also possible to generate limit-surfaces that interpolate between limit-surfaces of differing degrees. An example application of such interpolation is to interpolate between two limit surfaces of successive degrees. With current subdivision procedures, the topology resulting from subdividing a mesh with a dual scheme is drastically different from the topology resulting from subdividing using a primal scheme. This difference makes it difficult to produce a result that is partway between an even-degree and odd-degree surface. By using the procedure described herein, the only difference between subdividing for a degree-two limit surface and a degree-three limit surface is a smoothing pass. The topology is otherwise identical. Therefore, to produce a limit-surface that is, x % between a degree two and a degree three surface, the procedure needs simply to be modified to perform one smoothing pass, and then on the second smoothing pass, take (100-x) % of the current value and x % of the result of SmoothVertex.

This interpolation can be extended to allow the surface degree to vary over the surface. Every vertex may be associated with a real number specifying the target surface degree desired locally at that vertex. A fractional degree implies an interpolation of the limit surfaces with degrees of the lesser and the greater whole integer (e.g., 2.5 would specify an average of the limit-surfaces of degree two and degree three). Then, the number of smoothing passes performed, and the amount of interpolation done, is then varied for each vertex, depending on the degree associated with the vertex. In particular, the Arbitrary_Degree_Subdivision procedure would be modified to only perform enough smoothing passes to satisfy the maximum degree specified at a vertex. If this maximum degree is m, there would be m−1 smoothing passes. Second, for every smoothing pass i from 1 to m−1, the SmoothMesh function would only perform smoothing on a vertex if that vertex has a degree greater than or equal to the current smoothing pass i. Finally, the SmoothVertex function would perform interpolation if the vertex has a degree greater than i and less than i+1. For new vertices that are introduced by linear subdivision, the surface degree associated with the new vertex is computed in the same way that positions are computed: for a vertex introduced at the midpoint of an edge, the new vertex is given a goal surface degree of the average of the two endpoints. Similarly, a vertex introduced at the centroid of a face is assigned the surface degree that is the average of the degrees specified at the vertices of the original face.

As a result, it is possible to specify for the vertices of one portion of a mesh that the target surface degree is three, another portion the degree is two, and at a third place the degree is six. The surface will tend to converge to that degree surface, and in the regions where two different goals surface degrees are adjacent to each other, the procedure will produce a surface that smoothly transitions between the two.

The amount of smoothing performed can be specified in many ways. For example, the amount of smoothing may be performed by having the user paint on the subdivided surface, or may be supplied by looking up a texture pasted on the surface.

The degrees associated with the vertices can be smoothed during the subdivision procedure in the same way as the positions. The amount of smoothing performed on the degree property, however, is independent of the amount of smoothing performed on the positions. Therefore, the degrees associated with the vertices can be smoothed more, less, or the same amount as the positions, if smoothed at all. The more smoothing that is done, the smoother the transition between regions of differing degrees. If less smoothing is done to the degree property, the transition between regions of differing degrees will be more abrupt. Of course, the amount of smoothing done to the degrees can be varied as well. This variability provides the user with some control of the surface shape. For example, a user may be provided with a simple slider on a graphical user interface that controls the smoothness of a transition from one portion of the shape to another. The graphical user interface also may allow the user to paint the desired surface degree on the mesh.

All properties, not only the point positions, can be smoothed to different, and perhaps varying, degrees.

Creases and discontinuities in surface properties can also be properly handled for even degree subdivision surfaces using techniques known for odd degree subdivision surfaces. Current crease techniques allow the user to mark edges with a crease value specifying the intensity of the crease. During the smoothing pass, polyline subdivision is performed along the edges with non-zero crease values. The final position computed is then set to be a linear interpolation between the value resulting from doing normal smoothing, and the value resulting from doing polyline subdivision. The amount of linear subdivision is controlled by the crease value.

This technique cannot be applied in the Simple procedure of the Unified Reference or other even-degree schemes because they use the dual operation. The edges defining the crease in the original mesh do not exist in the dual, and hence, the geometrical crease cannot be represented. With the Arbitrary_Degree_Subdivision procedure, however, these edges do exist, and creases can be created using the Arbitrary_Degree_Subdivision_Polyline on the edges marked as being on the crease. This method of handling creases can be extended further, however, because the topology of the mesh is independent of the amount of smoothing. Current crease rules are forced to produce crease curves with odd degree, and interpolate between this curve and normal smoothing. With the procedure described herein, however, creases can be created with arbitrary degree. For example, a degree-three surface can be created with a degree two crease. In addition, as mentioned above, the degree of the crease can also vary along the polyline defining the crease. Crease rules (such as those described in the Crease Reference) can still be used to interpolate between normal smoothing and the crease curve.

Such subdivision procedures may be implemented using a computer program on a general purpose computer. Such a computer system typically includes a processor, an input device, a display device, and a memory. The memory stores software for performing the various functions described above. The computer display device displays a software generated user interface to enable a user to input data and to visualize a subdivided surface. The computer program would be stored on a computer-readable medium and executed by the computer to cause the computer to perform the various procedures and operations outlined above. A computer program may implement, for example, any one or more of the operations designated in the data flow described in FIG. 6.

The computer system may be a general-purpose computer, which is available from a number of computer system manufacturers as is well known by those of ordinary skill in the art. The computer system executes an operating system, such as the WINDOWS operating system from Microsoft Corporation, the OS X operating system from Apple Computer, the SOLARIS operating system from Sun Microsytems, Inc., the IRIX operating system from Silicon Graphics, Inc., or a version of the UNIX operating system. The invention is not limited to any particular computer system or operating system. The memory stores data and instructions. The memory may include both a volatile memory, such as RAM, and non-volatile memory, such as a ROM, a magnetic disk, an optical disk, a CD-ROM or the like. The input device allows the user to interact with the computer system. The input device may include, for example, one or more of a keyboard, a mouse, or a trackball. The display device displays a user interface. The display device may include, for example, a cathode ray tube (CRT), a flat panel display, or some other display device.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for generating a surface from meshes of arbitrary topology, the method comprising:
    receiving as input to a three-dimensional modeling and/or animation application executing on a computer system a mesh that includes a plurality of vertices, a plurality of edges, and one or more faces;
    initially linearly subdividing the mesh in order to obtain an intermediate mesh;
    for each of a non-zero number of desired subdivision levels, additionally linearly subdividing the intermediate mesh, and for each of a number of surface degrees, less one, smoothing the additionally linearly subdivided intermediate mesh; and
    displaying on a display device the smoothed and linearly subdivided mesh and/or storing a representation of the smoothed and linearly subdivided mesh in a memory included within the computer system.

2. The computer-implemented method of claim 1, wherein the number of surface degrees is an even number.

3. The computer-implemented method of claim 1, further comprising:
    propagating properties associated with the mesh to the smoothed and linearly subdivided intermediate mesh.

4. The computer-implemented method of claim 2, further comprising:
    marking an edge of the mesh with a crease value specifying an intensity of a crease;
    performing polyline subdivision along the edge marked with the crease value, according to the crease value, to provide a result; and
    interpolating between the smoothed and linearly subdivided intermediate mesh at the marked edge and the result of the polyline subdivision of the marked edge.

5. The computer-implemented method of claim 1, wherein the surface degree is a fraction between first and second integers, and
    wherein smoothing the linearly subdivided intermediate mesh comprises:
        smoothing the linearly subdivided intermediate mesh to provide a result;
        smoothing the result; and
        interpolating between the result and the smoothed result according to the fraction.

6. The computer-implemented method of claim 1, wherein each vertex is associated with a number specifying a target surface degree desired locally at the vertex.

7. The computer-implemented method of claim 6, wherein for at least one vertex the number is a fractional number.

8. The computer-implemented method of claim 6, wherein the surface degree defining a number of smoothing operations to be performed is defined for each vertex by the number associated with the vertex and wherein the number associated with each vertex may vary in the mesh.

9. The computer-implemented method of claim 6, wherein a vertex introduced at the midpoint of an edge by the linear subdivision is associated with a number specifying a surface degree according to an average of vertices defining the edge.

10. The computer-implemented method of claim 6, wherein a vertex introduced at the centroid of a face by the linear subdivision is associated with a number specifying the surface degree according to an average of degrees specified at vertices of the face.

11. A computer-implemented method for generating a surface from meshes of arbitrary topology, the method comprising:
    receiving as input to a three-dimensional modeling and/or animation application executing on a computer system a mesh that includes a plurality of vertices, a plurality of edges, and one or more faces;
    initially linearly subdividing the mesh;
    linearly subdividing the initially subdivided mesh;
    smoothing the linearly subdivided, initially subdivided mesh to obtain an intermediate mesh;
    additionally smoothing the intermediate mesh for each of a number of surface degrees less one; and
    repeating upon the additionally smoothed intermediate mesh an additional linear subdivision and the additional smoothing step for each of a number of desired subdivision levels; and
    displaying on a display device the smoothed and linearly subdivided mesh and/or storing a representation of the smoothed and linearly subdivided mesh in a memory included within the computer system.

12. A computer-readable storage medium storing instructions that, when executed by a processor, cause the processor to subdivide a surface defined by a mesh that includes a plurality of vertices, a plurality of edges, and one or more faces, by performing the steps of:
    initially linearly subdividing the mesh in order to obtain an intermediate mesh;
    for each of a non-zero number of desired subdivision levels, additionally linearly subdividing the intermediate mesh, and for each of a number of surface degrees, less one, smoothing the additionally linearly subdivided intermediate mesh; and
    storing for display a representation of the smoothed and linearly subdivided mesh in a memory of a computer system.

13. A computer system for performing subdivision of a surface, wherein the surface is defined by a mesh comprising a plurality of vertices, a plurality of edges and one or more faces, comprising:
    a display device;
    a processor;
    a memory storing instructions that, when executed by the processor, cause the computer system to:
        initially linearly subdivide the mesh in order to obtain an intermediate mesh,
        for each of a non-zero number of desired subdivision levels, additionally repeatedly linearly subdivide the intermediate mesh, and smooth the additionally linearly subdivided intermediate mesh for each of a number of surface degrees, less one, and display the smoothed and linearly subdivided mesh on the display device and/or store a representation of the smoothed and linearly subdivided mesh in the memory.

14. A computer-implemented method for subdividing a polyline, the method comprising:

receiving the polyline as input to a three-dimensional modeling and/or animation application executing on a computer system, wherein the polyline includes a plurality of vertices and one or more segments;

initially linearly subdividing the polyline in order to obtain an intermediate polyline;

for each of a non-zero number of desired subdivision levels, additionally linearly subdividing the intermediate polyline, and for each of a number of curve degrees, less one, smoothing the additionally linearly subdivided intermediate polyline; and displaying on a display device the smoothed and linearly subdivided polyline and/or storing a representation of the smoothed and linearly subdivided polyline in a memory included within the computer system.

15. The computer-implemented method of claim 14, wherein the number of curve degrees is an even number.

16. The computer-implemented method of claim 14, further comprising:

propagating properties associated with the polyline to the smoothed and linearly subdivided intermediate polyline.

17. The computer-implemented method of claim 14, wherein the curve degree is a fraction between first and second integers, and wherein smoothing the linearly subdivided intermediate polyline comprises:

smoothing the linearly subdivided intermediate polyline to provide a result;

smoothing the result; and interpolating between the result and the smoothed result according to the fraction.

18. The computer-implemented method of claim 14, wherein each vertex is associated with a number specifying a target curve degree desired locally at the vertex.

19. The computer-implemented method of claim 18, wherein for at least one vertex the number is a fractional number.

20. The computer-implemented method of claim 18, wherein the curve degree defining a number of smoothing operations to be performed is defined for each vertex by the number associated with the vertex and wherein the number associated with each vertex may vary in the polyline.

21. The computer-implemented method of claim 18, wherein a vertex introduced at the midpoint of a segment by the linear subdivision is associated with a number specifying a curve degree according to an average of vertices defining the segment.

22. A computer-readable storage medium storing instructions that, when executed by a processor cause the processor to subdivide a polyline that includes a plurality of vertices and one or more segments, by performing the steps of:

initially linearly subdividing the polyline in order to obtain an intermediate polyline;

for each of a non-zero number of desired subdivision levels, additionally linearly subdividing the intermediate polyline, and for each of a number of curve degrees, less one, smoothing the additionally linearly subdivided intermediate polyline; and storing for display a representation of the smoothed and linearly subdivided polyline in a memory of a computer system.

23. A computer system for performing subdivision of a polyline, wherein the polyline comprises a plurality of vertices and one or more segments, comprising:

a display device;

a processor;

a memory storing instructions that, when executed by the processor, cause the computer system to:

initially linearly subdivide the polyline in order to obtain an intermediate polyline, for each of a non-zero number of desired subdivision levels, repeatedly linearly subdivide the intermediate polyline and smooth the linearly subdivided intermediate polyline for each of a number of curve degrees, less one, and display the smoothed and linearly subdivided polyline on the display device and/or store a representation of the smoothed and linearly subdivided polyline in the memory.

24. A computer-implemented method for subdividing a polyline, the method comprising:

receiving the polyline as input to a three-dimensional modeling and/or animation application executing on a computer system, wherein the polyline includes a plurality of vertices and one or more segments;

initially linearly subdividing the polyline in order to obtain an intermediate polyline;

linearly subdividing the intermediate polyline;

smoothing the linearly subdivided intermediate polyline;

repeatedly smoothing the smoothed, linearly subdivided intermediate polyline for each of a number of curve degrees less one;

repeating the steps of linearly subdividing, smoothing and repeatedly smoothing of the intermediate polyline for each of a non-zero number of desired subdivision levels; and displaying on a display device the smoothed and linearly subdivided polyline and/or storing a representation of the smoothed and linearly subdivided polyline in a memory included within the computer system.

* * * * *